Figure 1:
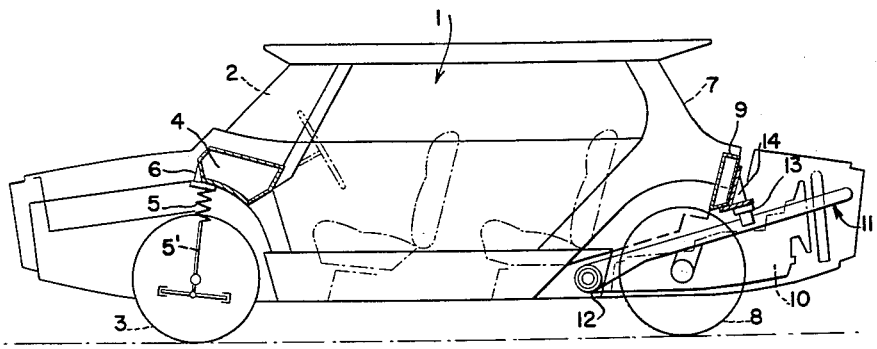

Dec. 5, 1961     B. BARÉNYI     3,011,796

FRAME CONSTRUCTION FOR MOTOR VEHICLES

Filed Sept. 3, 1957

INVENTOR

BÉLA BARÉNYI

BY Dicke and Craig

ATTORNEYS

United States Patent Office 3,011,796
Patented Dec. 5, 1961

3,011,796
FRAME CONSTRUCTION FOR
MOTOR VEHICLES
Béla Barényi, Stuttgart-Vaihingen, Germany, assignor to Daimler-Benz Aktiengesellschaft, Stuttgart-Unterturkheim, Germany
Filed Sept. 3, 1957, Ser. No. 681,737
Claims priority, application Germany Sept. 22, 1956
4 Claims. (Cl. 280—106.5)

The present invention relates to a frame construction including longitudinal and cross bearer members for the superstructure or vehicle body of a passenger motor vehicle, and consists essentially in that two main cross bearer members are disposed above the wheel axles, approximately at the height of the upper tire edges, and in that the suspension parts for the wheels as well as possibly the drive aggregate are spring-supported thereagainst. The main cross bearer members thereby absorb in an advantageous manner the principal shocks impinging on the wheels and thereby prevent an excessive loading or stressing of the vehicle superstructure or body by these shocks.

According to the present invention, the frame may be appropriately so constructed that the main cross bearer members are disposed, as seen in the direction of normal movement of the vehicle, behind the vertical transverse planes containing the wheel axes. The main cross bearer members may advantageously be constructed as hollow bearer members, for example, of box-like shape and may be provided at undersides thereof with abutment surfaces for the suspension devices of the wheels. Possibly, bracket-like projections may be arranged at the main cross bearer members which form the support or abutment surfaces for the wheel suspensions or enlarge the same.

According to the present invention, the wheel suspensions may be supported at the main cross bearer members directly as well as indirectly. In a frame construction according to the present invention for a passenger motor vehicle with a rear engine and with individually suspended front wheels both types of suspensions or supports, i.e., either direct or indirect, may find advantageous application, for example, in such a manner that the front wheel spring system, on the one hand, is directly supported at the main cross bearer member and the rear engine and the rear wheels, on the other, are supported indirectly at the main cross bearer member by means of an auxiliary frame. The front wall of the forward cross bearer member may thereby be disposed appropriately at least approximately in the direction, i.e., parallel to the direction of the shocks coming from the individually directly suspended front wheels.

Accordingly, it is an object of the present invention to provide a frame construction for a motor vehicle which is particularly suitable to absorb the shocks from the road wheels.

It is still another object of the present invention to provide a frame construction for motor vehicles consisting of longitudinal and cross bearer members in which the road shocks are suitably absorbed principally at two elevated cross bearer members forming the main cross bearer members to thereby protect the motor vehicle superstructure or body against excessive loading or stressing.

Still another object of the present invention resides in the provision of cross bearer members of a motor vehicle frame which are disposed relatively high above the wheel axles, and which permit either direct or indirect suspension therefrom of the wheels as well as the drive aggregate.

Figure 2:
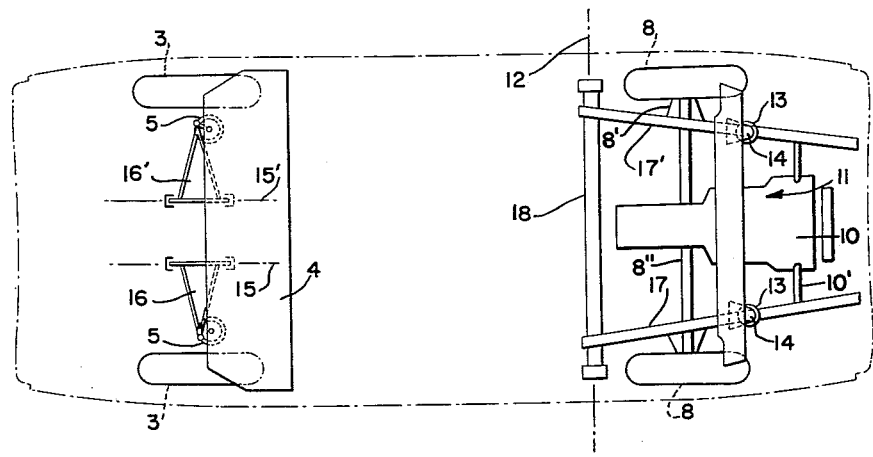

These and other objects, features and advantages of the present invention will become more obvious from the following description when taken in connection with the accompanying drawing which shows, for purposes of illustration only, one embodiment in accordance with the present invention, and wherein:

FIGURE 1 is a partially schematic longitudinal cross-sectional view of a passenger motor vehicle provided with a frame construction and suspension in accordance with the present invention, and FIGURE 2 is a plan view of FIGURE 1 with certain parts omitted therefrom for clarity's sake.

Referring now to the drawing, wherein like reference numerals are used throughout the various views to designate like parts, reference numeral 1 generally designates a motor vehicle body of a passenger motor vehicle which may be, for example, of pontoon shape and of the type described in my copending applications Serial No. 687,519, filed October 1, 1957, and Serial No. 687,520, filed October 1, 1957. A cross bearer member 4 constructed of box-shape is arranged in the forward vehicle part below the windshield pane 2 and above the upper tire edge of the front wheels 3. The cross bearer member 4 preferably extends over essentially the entire width of the motor vehicle body 1. The two front wheels 3 are individually spring-suspended at the chassis or frame construction of the motor vehicle by conventional means shown schematically in FIGURE 1 as including springs 5 and spring support means 5'. The spring suspension may include, for example, wheel carriers (not shown) which may be of any conventional construction and which are pivotally arranged about a longitudinal axis 15 or 15' of the motor vehicle by means of any conventional type of suspension, for example, by guide link means 16 and 16', which may consist of two superposed guide arms or guide links, and are further spring-supported at the cross bearer 4 by means of coil springs 5. For that purpose, corresponding abutment surfaces are provided at the underside of the cross bearer member 4 which may be enlarged by bracket-like projections 6 secured to the cross bearer member 4.

A cross-bearer member 9 is disposed behind the rear window pane 7 above the upper tire edge of the rear wheels 8 which rear cross member 9 is again constructed as a hollow bearer member of box shape. The entire rear drive aggregate including the rear wheels 8 together with rear engine 10 is suspended by conventional means at an auxiliary frame generally designated by reference numeral 11. The suspension means for the rear drive aggregate is shown schematically in FIGURE 2 and includes means 8' of any conventional type for supporting the wheels at the auxiliary frame and means 10' for supporting the engine at the auxiliary frame. A drive means 8" is provided for the rear wheels. Both suspension 10' and drive means 8" may be of any conventional type.

The auxiliary frame which supports the entire rear drive aggregate is so supported at the main frame that it pivots about a cross axis 12. The cross axis 12 is thereby disposed as low as possible and at a distance ahead of and below rear cross bearer member 9. The auxiliary frame 11 is springingly supported at the cross bearer member 9 by spring support means 13 of any suitable type which abut against the abutment surfaces at the lower side of the cross bearer member 9. The latter may thereby again be provided with bracket-like projections 14 to enlarge the abutment surfaces thereof. The cross bearer members 4 and 9 as shown particularly in FIGURE 1 form the forward and rearward terminations of the vehicle frame construction.

Both cross bearer members 4 and 9 are connected with each other in any suitable manner by conventional longitudinal bearer members, for example, of box-like construction (not shown in the drawing) and disposed on both sides of the vehicle symmetrically with respect to the longitudinal center plane of the vehicle. Furthermore, additional cross bearer members such as transversely extending or X-shaped bearer members may be used to reinforce the frame construction in accordance with the present invention to provide a vehicle frame for the vehicle superstructure or body which is particularly rigid against torsion or twisting.

The auxiliary frame 11 includes two longitudinally extending members 17 and 17' which are suitably reinforced by means of one cross member 18. The longitudinal members 17 and 17' are thereby rigidly secured to the cross member 18 which itself is pivotally mounted in any suitable manner, for example, in the longitudinal side frame bearer members of the main frame. It is also understood that the longitudinal frame members 17 and 17' of the auxiliary frame may be reinforced by further cross members.

While I have shown and described one preferred embodiment in accordance with the present invention, it is understood that the same is not limited thereto but is susceptible of various changes and modifications within the present invention, and I intend to cover all such changes and modifications as encompassed by the appended claims.

I claim:

1. A frame construction for the body of a vehicle having front and rear wheels and a rear-mounted engine, comprising a main frame having a plurality of longitudinal bearer members and front and rear cross bearer members, each of said cross bearer members having a box-like shape and an underside, said front cross bearer member being disposed above the front wheel axes near the upper edge of said front wheels and behind the vertical transverse plane of the vehicle extending through the front wheel axes, said rear cross bearer member being disposed above the rear wheel axes near the upper edge of said rear wheels and behind the vertical transverse plane of the vehicle extending through the rear wheel axes, means for individually spring-suspending said front wheels at the underside of said front cross bearer member including spring elements and abutment surface means on said front cross bearer member for said spring elements, and means for spring-suspending said rear wheels at the underside of said rear cross bearer member including spring elements and an abutment surface means on said rear cross bearer member for said last-mentioned spring element, said means for spring-suspending said rear wheels further including an auxiliary frame pivotally supported on said main frame and supporting said rear-mounted engine, the pivot axis of said auxiliary frame being arranged in front of and below said rear cross bearer member.

2. A frame construction for a vehicle as defined in claim 1, wherein said auxiliary frame includes two longitudinally-extending support members and at least one reinforcing cross member, said reinforcing cross member being pivotally mounted in said longitudinal bearer members of the main frame and the pivot axis of the auxiliary frame extending axially through said reinforcing cross member.

3. A frame construction for a vehicle as defined in claim 2, wherein said two longitudinally-extending members extend rearwardly and upwardly from said main frame, and wherein said pivot axis of the auxiliary frame is arranged in front of said rear wheels.

4. A frame construction for a vehicle as defined in claim 1, wherein said abutment surface means for said front and rear spring elements are formed, respectively, by bracket means extending forwardly of said front cross bearer member and by bracket means extending rearwardly of said rear cross bearer member.

References Cited in the file of this patent

UNITED STATES PATENTS

| | | |
|---|---|---|
| 2,128,660 | Moorhouse | Aug. 30, 1938 |
| 2,148,781 | Smith | Feb. 28, 1939 |
| 2,393,623 | Ehrenberg | Jan. 29, 1946 |
| 2,732,902 | Barenyi | Jan. 31, 1956 |
| 2,746,556 | Nallinger | May 22, 1956 |
| 2,755,098 | Jochumsen | July 17, 1956 |
| 2,756,834 | Dauben | July 31, 1956 |

FOREIGN PATENTS

| | | |
|---|---|---|
| 446,180 | Italy | Mar. 11, 1949 |